United States Patent
Falik et al.

(10) Patent No.: US 8,543,796 B2
(45) Date of Patent: Sep. 24, 2013

(54) OPTIMIZING PERFORMANCE OF INSTRUCTIONS BASED ON SEQUENCE DETECTION OR INFORMATION ASSOCIATED WITH THE INSTRUCTIONS

(75) Inventors: Ohad Falik, Kfar-Saba (IL); Lihu Rappoport, Haifa (IL); Ron Gabor, Raanana (IL); Yulia Kurolap, Haifa (IL); Michael Mishaeli, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 12/290,962

(22) Filed: Nov. 5, 2008

(65) Prior Publication Data

US 2010/0115240 A1 May 6, 2010

(51) Int. Cl.
G06F 9/30 (2006.01)

(52) U.S. Cl.
USPC .......................... 712/209; 712/208

(58) Field of Classification Search
USPC .......................... 712/210, 208, 209
See application file for complete search history.

(56) References Cited

U.S. PATENT DOCUMENTS

| | | | | |
|---|---|---|---|---|
| 5,481,684 A * | 1/1996 | Richter et al. | ................. | 712/212 |
| 5,542,059 A * | 7/1996 | Blomgren | ......................... | 712/41 |
| 5,781,750 A * | 7/1998 | Blomgren et al. | ............ | 712/209 |
| 6,269,440 B1 * | 7/2001 | Fernando et al. | ............. | 712/241 |
| 6,810,502 B2 * | 10/2004 | Eidson et al. | ................ | 714/786 |
| 6,959,379 B1 * | 10/2005 | Wojcieszak et al. | ........... | 712/241 |
| 7,698,354 B2 * | 4/2010 | Hennedy et al. | ............... | 708/300 |
| 2003/0153996 A1 | 8/2003 | Manzolati | | |
| 2005/0138329 A1 | 6/2005 | Subramoney et al. | | |
| 2005/0155026 A1 | 7/2005 | DeWitt, Jr. et al. | | |
| 2007/0150705 A1 | 6/2007 | Mishaeli et al. | ............... | 712/218 |
| 2008/0244224 A1 * | 10/2008 | Sassone et al. | .................. | 712/23 |

FOREIGN PATENT DOCUMENTS

JP  H10-91430  10/1998
KR  1998-0079634  11/1998

OTHER PUBLICATIONS

Chinese Patent Office, Office Action mailed Jun. 26, 2012 in Chinese application No. 200911000152.7.
Korean Patent Office, Office Action mailed Jul. 20, 2012 in Korean application No. 2011-7007717.
Korean Patent Office, Combined Search Report and Written Opinion for PCT Application No. PCTUS2009062736, dated May 31, 2010, 9 pgs.
Japanese Patent Office, Notice of Reasons for Rejection mailed Apr. 2, 2013 in Japanese application No. 2011-534805.
State Intellectual Property Office (SIPO) of the People's Republic of China, Office Action mailed Apr. 9, 2013 in Chinese application No. 200911000152.7.

* cited by examiner

*Primary Examiner* — Aimee Li
(74) *Attorney, Agent, or Firm* — Trop, Pruner & Hu, P.C.

(57) ABSTRACT

In one embodiment, the present invention includes an instruction decoder that can receive an incoming instruction and a path select signal and decode the incoming instruction into a first instruction code or a second instruction code responsive to the path select signal. The two different instruction codes, both representing the same incoming instruction may be used by an execution unit to perform an operation optimized for different data lengths. Other embodiments are described and claimed.

14 Claims, 5 Drawing Sheets

OPTIMIZING PERFORMANCE OF INSTRUCTIONS BASED ON SEQUENCE DETECTION OR INFORMATION ASSOCIATED WITH THE INSTRUCTIONS

BACKGROUND

In many processor-based systems, the processor provides instructions tuned for efficient implementation of copy or store operations. Optimized software for memory copy operations is tuned for a specific processor implementation. In many cases, the optimal way for performing the data copy is changing, and the code serves as a moving target for compiler, operating system (OS) kernel and application writers, which are forced to use multiple proliferations tuned for the different scenarios, different micro-architectures and so forth.

An iterative copy instruction can be used to copy a certain amount of data elements as specified by one of the instruction's parameters. Iterative copy operations may have different native data element lengths, such as byte, word double word, quad word, etc. The longer the native length is, the instruction may be more efficient in moving a quanta of data since it may use larger 'load' and 'store' operations. For example, in Intel® Architecture (IA32) architecture a repeat move byte (REP MOVSB) instruction uses the value in a given register as indicator of the length of the copy. In addition, the instruction receives source pointer and destination pointer as input parameters. Such instruction is defined to move one byte of data 'one at a time'. In some cases, the instruction's implementation may switch to a 'fast mode' where the operations are performed using longer operations (e.g., 16-bytes at a time). The IA32 programmer's reference manual defines the conditions in which such fast-mode may be executed in current processors.

As the length of copy and set operations is in many cases unknown at compile time, one solution for improving the efficacy of the copy operations with prior implementations of the iterative copy operations is to use a first iterative copy instruction that moves the majority of the string followed by a second iterative copy instruction that moves the remainder of the data (e.g., first copy operation moved double word at a time and second copy the last 0-3 bytes). Such sequence has two drawbacks: (a) the second instructions cost additional cycles that are always paid even when the remainder is zero; and (b) the optimization is tuned for a specific length of the first iterative copy instruction followed by only a limited sequence of instructions for the second; any other combination will cause a significant performance loss.

Further, in a pipelined machine, it often happens that an instruction's best behavior needs to be decided at instruction decode time, even though some of the data required for making the decision is unknown or is not committed yet. One example of this is branches, which need to be taken or not-taken depending on flags, even if the flags are not calculated yet. To resolve such problem the most common scheme is the use of branch predictors. Such predictors require time for training (building the history), have high costs (as much state needs to be saved), and their performance under flaky patterns is uncertain.

DETAILED DESCRIPTION

Figure 1:
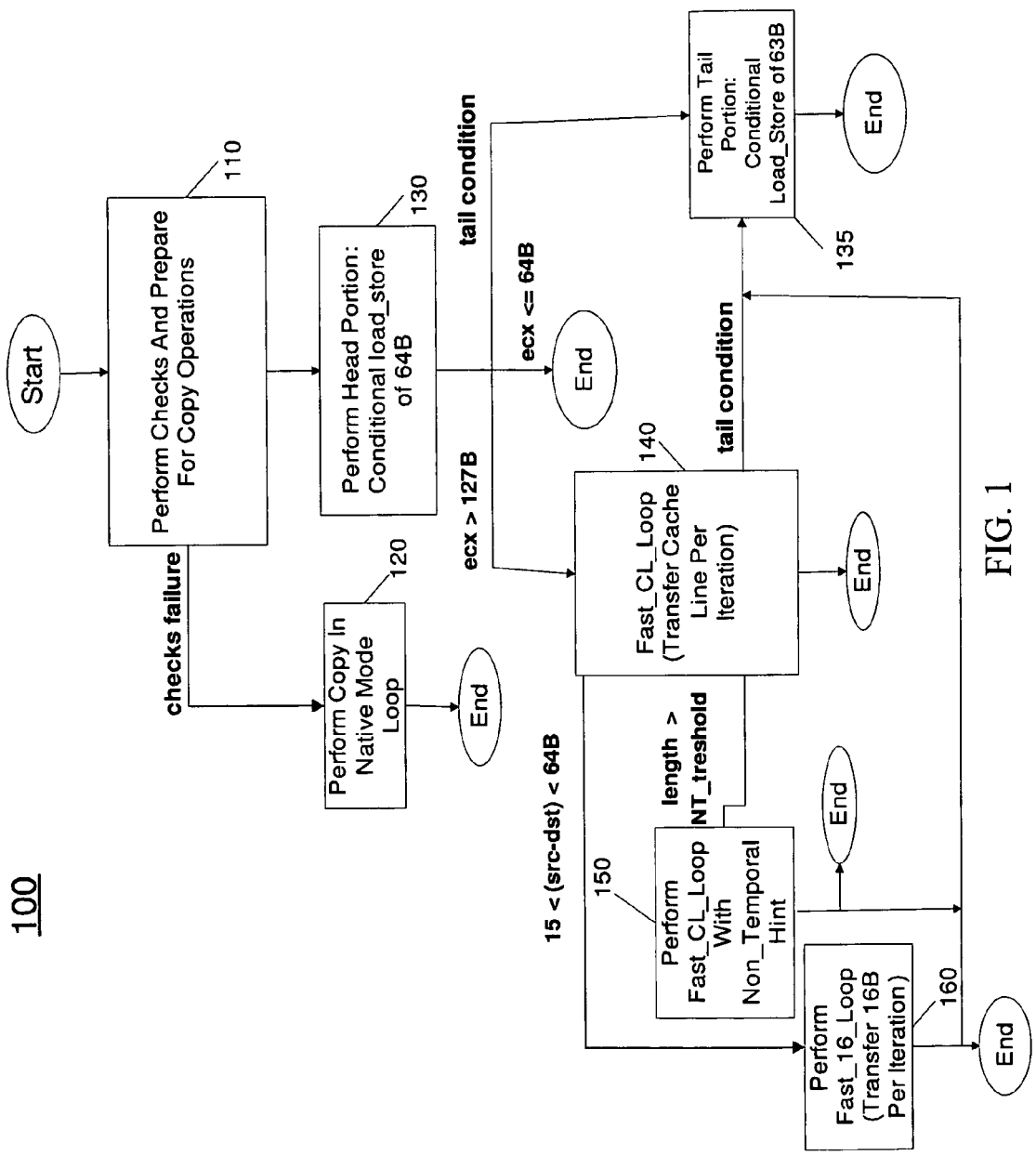
FIG. 1 is a flow diagram of a method in accordance with one embodiment of the present invention.

In various embodiments, properties of compiler-generated copy operations may be used to perform iterative copy operations more efficiently. As used herein, the term "copy" operations is used as a generic term for memory copy, memory move and memory set operations that move data within, into or out of memory. Different environments may use different names for these generic operations. A 'fast mode' of these copy operations can be performed in many instances. Even when unavailable (e.g., when an aliasing-risk-test fails), in many cases (assuming random distribution) a mode faster than a native mode, in which a single data element is copied at a time, can still be performed. An optimized copy sequence thus attempts to execute the copy using one of several different fast modes (i.e., faster than a native mode) from its beginning and only in seldom cases will result in doing the copy operations using a native length operation. A processor instruction set may include one or more instructions to direct the processor to perform memory copy or memory set (store) operations which when implemented efficiently, can allow the processor hardware to keep its performance edge across different micro-architectural and architectural generations.

As will be described further below, one embodiment may include several main steps (described in details below), including the following: (1) performing checks for the rules required for starting the 'fast copy' and set up operations for later steps; (2) a head-portion where conditional copies are done (to cover latency of the pipeline to prevent bubbles caused by propagation using conditional operations); (3) a fast fixed size iteration with flavors for handling interesting cases; and (4) a tail portion. The checks and the head portions (steps 1 and 2) are executed for all string lengths (i.e., copy length or block length). Note the head portion is executed in case all the checks pass; otherwise the hardware enters the native loop, which performs the copy operation at their native size one at a time. The fast loop and tail part are executed as needed depending on the copies' length as analyzed in the head portion. By making the decision early, the execution path may be selected with minimal pipeline bubbles and no branch miss predicts. There can be some additional restrictions applied for some of the lengths' or src-dst distance handling, such as in the 'fast loop' in some implementations there can be a non-accurate exception detection that will require re-executing some of the operations, for allowing going back up to 64 B, in addition to the checks done at the head, a check needs to be done to see if destination point is no more than 63 B behind the source pointer (i.e., (dst mod 4K)–(src mod 4K)<63 B). When such an additional check fails, it may still be possible to diverge to a less optimal code routine for correct execution. Also, in some embodiments there can be an optional special handling for a case where the copy operation length is very long and caching hints may be used to improve performance. Note that while described herein with specifically sized copy operations, the scope of the present invention is not so limited and embodiments may handle copy operations optimized for other sizes (e.g., differing numbers of bytes and cacheline widths).

Referring now to FIG. 1, shown is a flow diagram of a method in accordance with one embodiment of the present invention. Method 100 can be performed in various locations of a processor such as a general-purpose or dedicated hardware unit. Method 100 may be used to perform iterative copy operations in an optimized manner. As shown in FIG. 1, method 100 may begin by performing checks and preparing for the copy operations (block 110). More specifically, various checks may be performed to determine the type of copy operations to be performed, as well as initializing various counters associated with the copy operations by loading into the counters various count values for use in the copy operations. First, several checks may be performed to determine if a fast flow, in which the copy operation is performed using load/store operations that are longer than native length of the instruction, can be executed. If any of the checks fail, a native mode loop is executed, in which copy operations are done using a native length of the instruction, e.g., byte for byte move operations or double word for double word instructions (block 120). Note that the checks use data obtained at the execution phase, where the information needed is already available and known. If any of the checks fail, a miss-speculation cost may occur along with the associated performance hit, however it is a rare case in the common use and the relative loss is also low due to the cost of the native loop.

In one embodiment, the conditions that are checked include checking the distance between destination (dst) and source (src) pointers of the string making sure that the src read ahead will not change the behavior of the operation. This distance is measured as follows; if 0 bytes (B)<((dst mod 4K)−src mod 4K))<16 B, an exit to native mode may occur. In alternative embodiments where memory aliasing between pages is of no concern, the operation may be done without the 'mod 4K'. Also a direction (DF) flag is checked. If DF flag=='1' an exit to native mode may occur. A check for wrap-around of the address space (for both src and dst) can be determined, and if true, this check causes an exit to native mode. Alternate implementations may add other conditions or eliminate some the conditions for entering into fast mode.

In block 110, preparation for a fast loop, e.g., the 'Fast Loop', and tail parts may also be performed. In one embodiment, this may include calculating a counter for the fast CL loop (for example if the length is specified in rcx register in bytes, and each loop operates on 64 bytes, the number of iterations is calculated using rcx/64) and loading it to a zero overhead counter register (assuming that the "head" part copies up to 64 B of data as to be discussed later and the counter is decremented by 1 when jumping into the fast loop 110). In some cases where the 'head' portion handles more than 64 B (e.g., 128 B) a constant may need to be subtracted from the rcx/64 calculation. Further, the tail condition is calculated and placed in a zero overhead jump control register.

If any of the checks fail, control passes to block 120, where the copy may be performed in native mode. In various embodiments, this native node can be used to perform the copy operation according to the native length mode, after which method 100 may conclude. Thus where the conditions needed for bunching copy operations are not met, the native length is used for each copy iteration (e.g., 1 byte per iteration for a repeat move byte instruction (REP MOVSB) case) using a zero overhead loop.

If instead the checks pass and it is determined that a fast copy operation can be performed (based on the checks and calculations in block 110), control passes from block 110 to block 130. At block 130, a head portion of the copy operation may be performed. More specifically, a conditional load/store which can handle any length up to a predetermined amount of data, e.g., 64 bytes may be performed. As will be described herein, in one such embodiment up to eight copy operations may be performed to copy the up to 64 bytes. More specifically, if the checks at block 110 pass, at this point the processor knows that copy operations that are longer than the native copy length can be executed without impacting the correctness of the result.

Thus at block 130, the copy operation is being using a 'conditional' operation, where each conditional copy of length 'N' bytes will be executed if the remaining length has at least 'N' bytes in it. Note that the condition is checked at execute time, thus it does not depend in propagation of the length information from the execute back to decode stage. In addition to the copy, each iteration will increment by 'N' the src and dst pointers to be used by the subsequent operation and will decrement the remaining length by 'N'.

The number of copy operations is set to allow the preparations done in the 'check' step (block 110) to propagate in the pipeline so that no penalty will be taken on them when they come to turn and be used at the decode stage. Note that the time it takes for the 'load zero overhead counter' or 'zero over head branch condition' to go from decode to finishing execution—which is the window in which the conditional operations are decoded and executed and equal to the depth of the pipe from decode to execute. Assuming the maximal load/store length the machine can handle (in bytes) is 'N=2^n" the copy sequence may be performed using a sequence of power of two lengths (which can be referred to as a power of two tree) as follows: 1, 1, 2, 4, . . . N/2, N, N, N. For example if N=16, and assuming that the processor requires 8 operations to cover the pipeline delay, the sequence will be 1, 1, 2, 4, 8, 16, 16, 16; which gives a maximal copy of 64 B. For each number in the range 0 to 64 B, there is a subset of the above operations that can move exactly that amount of data (e.g., to move 3 byte the 1 and 2 should be executed, or to move 10 byte the 2 and 8 should be executed). For another example, if N=32 and 8 operations are needed to cover the pipeline delay, the sequence will be 1, 1, 2, 4, 8, 16, 32, 32, which amount to 96 B. In some embodiments, it is efficient for the maximal amount of data that the conditional section can handle to be an integer multiplication of the size of the Fast Loop (e.g., 64 B×1=64 B or 64 B×2=128 B).

In one embodiment, the sequence of operations is actually executed in reverse order to the above list (e.g., 16, 16, 16, 8, 4, 2, 1, 1) to simply generating the sub-set of the operations required for correctly copying any number of bytes in the range of 0 to 64 B by the head portion of block 130. This is done by making the condition look at the remainder of the length and if Remainder_Length−N>0 the operation is done, otherwise it is skipped. The Remainder_Length is updated after each copy operation with the length of the operation. Note that instead of updating the src and dst pointers on every copy operation, it is possible to update only an offset from the original src and dst pointers and the src and dst pointers are updated to their new values at the end of block 130 (or at some other snapshot point in the middle of the block). This can save one 'add' operation in each conditional step.

At the end of the head portion 130, a multiple way decision is taken using the counter, loop type selected and conditions prepared in block 110. More specifically, if the zero overhead counter value is equal or greater than 1, the counter is decremented by 1 and the Fast Loop of block 140 is performed, otherwise if a tail condition is true (i.e., the remaining number of bytes is less than 64 but greater than zero), the tail portion is performed at block 135, otherwise, if no additional data is to be copied, method 100 concludes. The zero overhead counter value is thus used to determine if there is a need to call the 'Fast Loop.' The counter is loaded with the number of iterations+1, if the counter >1 it is decremented and jumps to the head of the 'Fast Loop'. If it is determined that the counter is=1 or less, there is no need to call that loop.

Referring still to FIG. 1, if the remaining count value is greater than 63 bytes, control passes to block 140 where a fast fixed size iteration that transfers, e.g., 64 bytes, and/or the size of a cache line of data per iteration may be performed. This is a fast loop that handles copy operations of a pre-defined length in the pre-loaded zero-overhead loop counter. In some embodiments, prior to executing the copy operation of block 140, a couple of checks are done that when hit will take a miss predict penalty (but will allow 'faster execution' in the cases where it happens). First, there can be an additional pointer's distance check performed, this may be required if limitations of the Fast Loop are more stringent than those in the conditional copy in the head. For example, a Fast Loop that does not keep track of its progress may need to re-execute from its beginning, which calls for a check of ((src mod 4K)–(dst mod 4K))>63 B in addition to all checks done before. If that check fails control passes to block 160, where a second fast loop is performed (discussed more fully below and which may correspond to a copy which does not have such limitation but may be slower to execute otherwise); (2) the remaining length of the string is checked and if the length is greater than a defined threshold (NT_threshold), control passes to block 150, which is a loop that uses a caching hint such as a non-temporal hint for the load and store operations (such as Intel's MOVNTDQA or MOVNTSQ instructions) to avoid cache pollution. In one embodiment this NT_threshold parameter can be tuned with respect to the cache size to achieve the best performance impact. Alternative implementations may use multiple threshold levels to determine best usage of different caching hints.

During each iteration of the loop of block 140, 64 B of data are copied in the fastest possible way (i.e., using an optimized code sequence for this copy length). The number of iterations is determined using the zero-overhead loop counter. At the end of the Fast Loop of block 140, the condition for handling the tail is checked and the following decision may be taken (with zero overhead again since the conditions were pre-set): if tail_condition=true, control passes to the tail portion at block 135, otherwise, if no additional data is to be copied, method 100 concludes.

Note that at block 160, the fast_16 loop is similar to Fast Loop, but copies 16 B in each iteration (according to an optimized sequence for this length of copy). The zero overhead counter is adjusted to allow 16 B iterations prior to the loop's execution.

After copying as many 64 B chunks as possible copy (or the other sizes of copy operations of blocks 140, 150 and 160), a remainder of the copy operation of up to 63 B may be left (note that the processor gets to this place only if there is such a tail). The tail is handled using a sequence of conditional copy operations at block 135 that similar to the sequence used by the head, with the difference that the sequence starts with a single one-byte (1, 2, . . . ), instead of two. Also, the tail length is set to be the size of the amount of data in one Fast Loop iteration minus one (e.g., 63 B=64 B-1), and is not related to the pipeline depth. So with the examples above of N=16 and Fast Lop being 64 B, the tail will be copied with the following data chunks: 16, 16, 16, 8, 4, 2, 1 bytes (7 operations), the reverse order is used to optimize the process of defining the sub set of operations to be moved, as discussed above for the head. With N=32, the tail sequence will be 32, 16, 8, 4, 2, 1 (6 operations).

Note that when the DF flag checked in block 110 is '1', the string is going in "reverse" order, and the source and destination pointers are decremented. The above-described algorithm treats this case with the native loop (by passing control to block 120). An alternate implementation may implement such copy, operations using a similar 'fast copy' sequence by reversing the operations on the pointer's adjust operations using a symmetrical scheme.

While the above implementation of method 100 may be for an iterative copy operation using a REP MOVSB instruction, other implementations may be used with other copy instructions. For example, an algorithm for use with a store instruction (e.g., REP STOSB) may use the same scheme as REP MOVSB, using most of the steps described above with the changes that instead of load+store used for the copy operation, only a store is performed. In addition there are some simplifications that are taken for the REP STOSB case: (1) no need to check the distance between src and dst; (2) no need to check the conditions on the src pointer. There is also an additional step required to prepare a store data register with the length of the longest store operation (N=16 or N=32 in the examples above) that holds the data replicated version for the store actions (the STOSB includes a one byte data that need to be duplicated in each of the bytes of the destination store data register).

While the implementation shown in FIG. 1 is for such a REP MOVSB and conditioned for 64-byte per iteration, other embodiments may be used to handle fast copy operations of different lengths. Furthermore, such operations may also be used to perform fast copy operations using other instructions such as a move double word length (e.g., REP MOVSD) or other such instruction. Alternate embodiments may take 'assumptions' regarding 'no aliasing' of pages (and thus removing the module 4K support).

As described above, some code sequences are optimized to perform desired operations in their most efficient manner for certain types of instructions that they include, in other sequences the same instructions may not perform in their most optimal way. Accordingly, in various embodiments a sequence detection technique may be implemented to analyze an incoming sequence of instructions and provide to an execution unit a code to enable an optimized manner of performing one or more instructions of a given code sequence.

As one example, IA32 REP MOVS and REP STOS operations are tuned for handling copy operations where the length is not known in advance. Current optimization is based on the use of REP MOVSD for moving the majority of the data and REP MOVSB for handling the remainder which in that usage is known to be 0-3 in length (information used to optimize the REP MOVSB execution time). An example of a code that implements these copy operations is shown in Table 1 (a similar structure applies to REP STOS):

TABLE 1

| movl | 0x0c(%esp),%edi | // load destination address |
| movl | %edi, %eax | |
| movl | 0x10(%esp),%esi | //load source address |
| movl | 0x14(%esp),%edx | //load length to edx |
| cld | | |
| movl | %edx, %ecx | // start of move sequence by setting ecx for 'double' count |
| shrl | $0x02,%ecx | |
| rep/movsl | (%esi),(%edi) | |
| movl | %edx, %ecx // | start setting of ecx for 'remaining byte' count |
| andl | $0x03,%ecx | |
| rep/movsb | (%esi),(%edi) | |

The REP MOVSB is optimized for this by handling quickly the cases where the length is 0-3 and taking a penalty on other lengths. Due to the operation preceding it, the scheme above makes sure the count never exceeds 0-3. However, there are various other sequences that may be used for performing this optimization, and especially for setting the count for the REP MOVSB instruction. Thus, changing the behavior of the REP MOVSB to be optimal for lengths other than 0-3, for example for using it in conjunction with a REP MOVSQ instruction will have a remainder length of 0-7, will cause such code to misbehave and lose performance in many cases (in the example, when the length is 4-7). Similarly, other optimizations for REP MOVSB, such as those that make it efficient for handling any length, and as part of that cause a degradation for the length of 0-3 case, will make the code described in Table 1 above misbehave and lose performance. The decision on what length the REP MOVSB should take needs to be taken at instruction decode time to prevent the loss of time in the pipeline delays, even though the value of ecx will only be known at execute time of the instruction, thus creating a 'bubble' that may cause performance loss.

In the described optimization (Table 1), the MOVSB follows shortly after a REP MOVSD instruction (to be referred to as a D+B sequence), this acts as a hint of the programmer's intention that the REP MOVSB instruction is to be for a limited number of bytes, e.g., 0-3 bytes. As such, embodiments may leverage this sequence hint to provide different instruction codes to an execution unit to enable optimization of (at least) this second copy instruction. Since the exact instruction sequence may vary, and other codes may be used to achieve the same result, instead of searching for a specific sequence, hardware is searching for a REP MOVSB that follows the REP MOVSD instruction by a small number of instructions (e.g., 1-9). Since it is not guaranteed to detect an D+B sequence, and it is also not guaranteed that a D+B sequence is not falsely detected, regardless of which flow is decoded and which optimization is selected, for any given data length, the decoding provides for correct execution.

Figure 2:
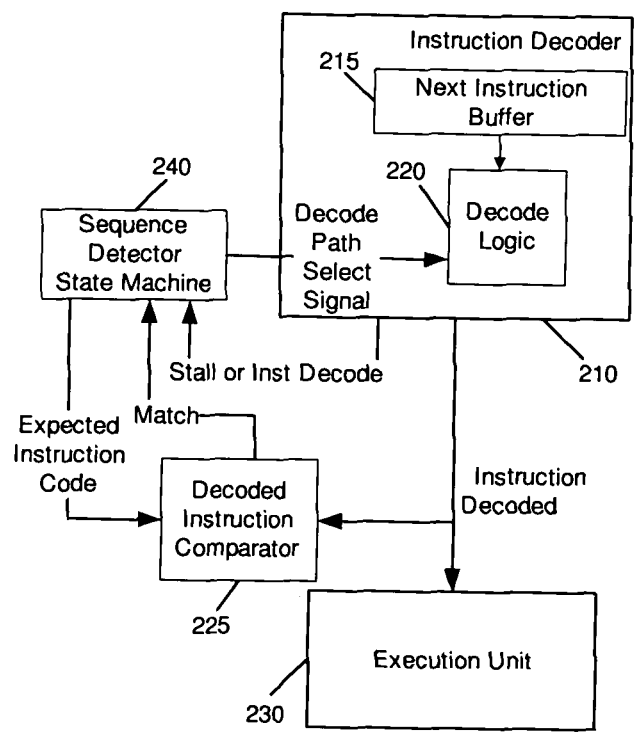
FIG. 2 is a block diagram of a sequence detector in accordance with one embodiment of the present invention.

Referring now to FIG. 2, shown is a block diagram of a sequence detector in accordance with one embodiment of the present invention. As shown in FIG. 2, a processor 200 may include an instruction decoder 210 that receives instructions to be performed. When received in the decoder, such instructions may be stored in a buffer 215. Buffer 215 may act to provide the next instruction for execution to a decode logic 220, which further receives a decode path select signal from a feedback path including a sequence detector state machine 240. Based on this select signal and various rules of decode logic 220, the instruction may be decoded and provided to an execution unit 230 for execution. Generally, decode logic 220 operates to receive incoming instructions and generate a decoded instruction therefrom. In one embodiment, such decoded instructions may be in the form of a machine code corresponding to the instruction, which is then provided to execution unit 230 to enable execution of an instruction. For example, such instruction code may cause the execution unit to execute a microcode sequence, or to select a given functional unit to perform the desired operation. Note that some decode logic circuits may perform the decode of several instructions in parallel. Other decode logic circuits may convert a single instruction to multiple directives for the execution.

As further shown in FIG. 2, the decoded instructions may be provided to a decoded instruction comparator 225 of the feedback path, where the decoded instruction may be compared to an expected instruction code received from state machine 240. This expected instruction code may correspond to a given instruction code that may be at the beginning of a code sequence desired to be optimized using state machine 240 and decode logic 220. In some implementations this may be implemented via an index to an internal micro-operations array. In some implementations, multiple such state machines and comparators may be provided, each of which is associated with a given instruction to be searched for in a code sequence. In other implementations, state machine 240 and comparator 225 may be extended to provide support for comparisons and analyses of such multiple instructions.

As shown in the embodiment of FIG. 2 for a single instruction implementation, if a match occurs between the two incoming codes to comparator 225, a match signal is reported from comparator 225 back to state machine 240. As further shown in FIG. 2, state machine 240 further receives a stall signal (or an instruction decode indication) from instruction decoder 210 in each cycle. Thus while FIG. 2 illustrates the case where the decode of instructions is done one at a time, it can be expanded for cases where multiple instructions are decoded in parallel. Instruction decoder 210 holds the instruction that is fed into decode logic 220. Decode logic 220, in one embodiment may include a logic function that parses the instruction using certain state information (e.g., the mode of the machine which may define some instructions to be illegal). The output of the decoder is a code noted as 'instruction decoded,' which identifies the micro-operations that will be performed for this instruction. The nature of these operations depends on the micro-architectural implementation of the machine, but may be looked at as a binary value (or a range of values) that uniquely describe the instruction. This code is passed to execution unit 230 to perform the operations corresponding to the instruction decoded in one or more cycles.

In one implementation, optimization is based on instruction sequences in a loose manner. It assumes that correct operation of the instruction is guaranteed regardless of the decision, which prevents the need to guarantee that the detection of the sequence is accurate in all cases, and can optimize to detect most of the sequence occurrences. Instruction comparator 225 compares the current instruction code from state machine 240 with the 'Next Instruction Code' received from instruction decoder 220. This code may cover a range of codes or more than one code depending on the state machine flow as will be discussed below. Once a match is detected, state machine 240 is moved to the next step. The state machine moves from one step to the other based on detection of a match (which may change from one state to the other) or based on time or instruction decoded count. When using time, a stall indication may be provided from instruction decoder 210 to prevent the state machine from 'counting' when instruction decoder 210 is stalled (e.g., due to waiting for fetch to complete from a lower level of the cache or memory or in the case that the execution unit is busy and can not take new instructions). By these stalls, the execution cycle counting becomes a close approximation to decoded instruction counting, and may be simpler to implement in some cases. Sequence detector state machine 240 feeds back to decode logic 220 a state information signal, shown in FIG. 2 as a 'Decode Path Select' signal. This state information changes decode logic 220 such that for the same instruction in the instruction buffer 215, decoder rules will signal different decoded instructions to execution unit 230.

To clarify the operation, an example that detects and optimizes the execution of REP MOVSB (and REP STOSB) for two cases is provided: (1) REP MOVSB used by itself for copying an un-known data length which is likely to be greater than three bytes (i.e., "long REP MOVSB" instruction); and REP MOVSB used in conjunction with REP MOVSD in a code sequence, in which case the length is expected to be in the range of 0-3 bytes for the REP MOVSB instruction, and referred to herein as "Short REP MOVSB". Thus two different codes can be output from instruction decoder 210 to cause execution unit 230 to run a selected one of two different optimized copy operations.

Figure 3:
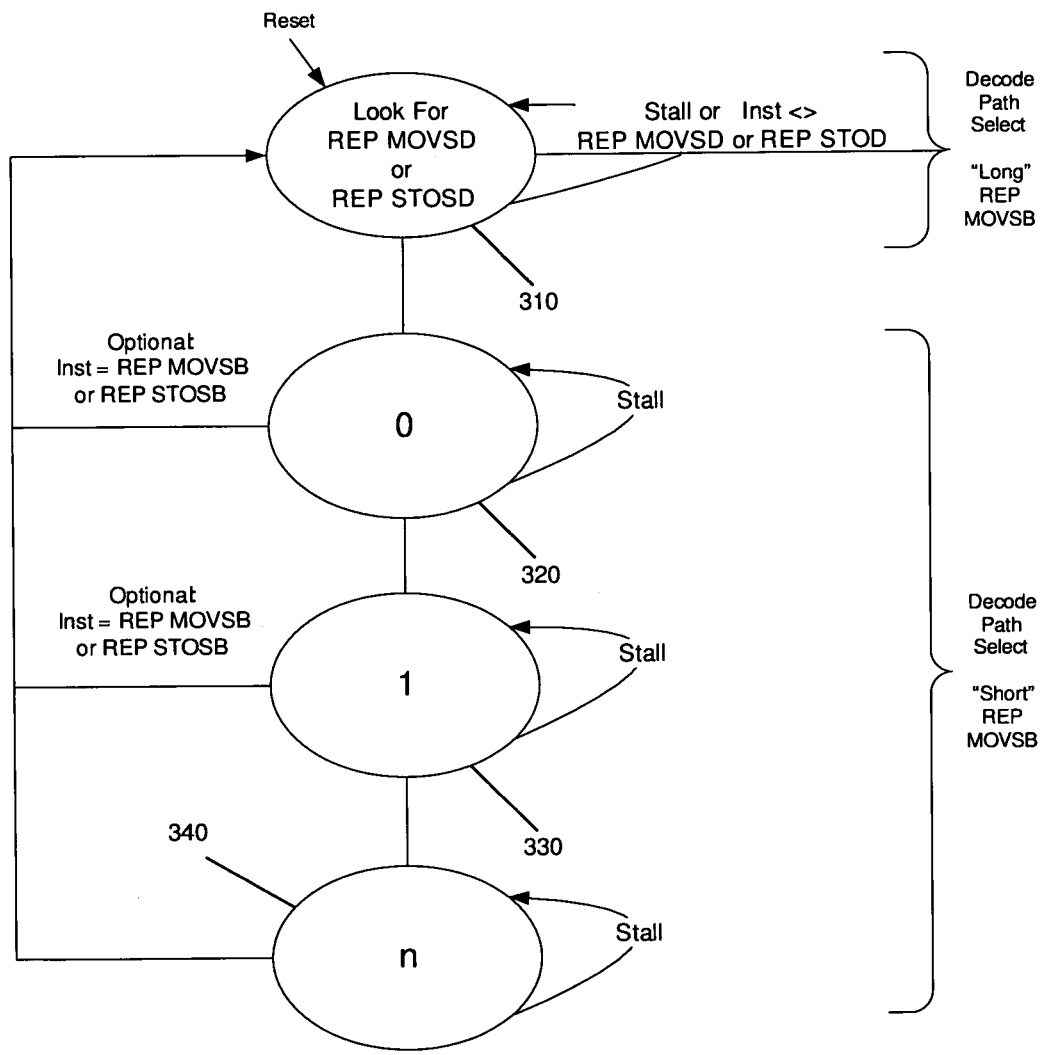
FIG. 3 is a state diagram of an example of a sequence decoder state machine in accordance with one embodiment of the present invention.

FIG. 3 is a state diagram of an example of a sequence decoder state machine in accordance with one embodiment of the present invention, and which illustrates the implementation of the state machine. As shown in FIG. 3, at operation 310 the state machine is reset to the case where it is looking for a REP MOVSD or REP STOSD instruction. In this case the Decode Path Select signal from the state machine is set to generate "long REP MOVSB" codes if a REP MOVSB is encountered within the code sequence. At the same time, the instruction detector is provided with the codes of REP MOVSD and REP STOSD, if either of the two is encountered, the indication is provided to the sequence detector state machine, which now switches to a mode where it is looking for a 'soon to follow' REP MOVSB or REP STOSB by providing the Decode Path Select signal to encode the code for a "Short REP MOVSB" operation. The state machine will stay in this state (at operations 320-340) for a threshold distance of the identified REP MOVSB or REP STOSD small number of 'n non-stall cycles' or equivalently 'n1 instructions'. n1 may be equal to n if one instruction is decoded at the time or larger than n (e.g., 4n) if multiple instructions may be decoded at the same time. In case of a fetch-stall or any other stall that prevents the decoder from issuing new instructions for this flow, the counting is stalled to guarantee sequence detection. In this example the number 'n' is small, for example, 4. After that delay, regardless of whether a REP MOVSB arrived, the sequencer returns to the initial state 310 of looking for REP MOVSD or REP STOSD as a start indication of a new REP MOVSD+B sequence. The cases where no REP MOVSB or REP STOSB was not detected cover the scenario that the code included only REP MOVSD and may include in other places 'only' a REP MOVSB. Events such as an interrupt in the middle of the state machine operation may be ignored, in some embodiments, as the ratio of their occurrence multiplied by the penalty of miss predict is small compare to the cost of the event.

Optionally, it can be implemented that the state machine will search for REP MOVSB or REP STOSB as an early exit from states 320 and 330 and back to state 310, however when the code sequence is short this is not needed (assuming there is no REP MOVSD to tightly follow the REP MOVSB and be missed on a fixed delay). Thus, in other embodiments, especially where a space of a sequence between identified instructions might be longer, upon detection of the second (or other additional instructions), the state machine can reset to the initial search state (state 310).

The fact that exact execution is guaranteed regardless of the optimization taken covers cases such as an exception taken between the REP MOVSD and REP MOVSB instructions. If such a rare condition occurs, the execution of the REP MOVSB may choose the non-optimal path, which may cost in some performance, but will not break the correct execution of the code. There are other cases that can cause miss-prediction such as flushing of the pipeline (e.g., REP MOVSB is decoded after a REP MOVSD and then flushed). In such a case it is typically desired that the state machine will not be reset, in which case there is a high probability that the REP MOVSB will be re-decoded within the window of delay allowed.

In one embodiment, the implementation of the sequence detector state machine can be relaxed to allow correctly handling cases where the flows are not exact and fluctuations occur. For example, the use of a timer (counting non-stall clocks or instructions), instead of a search for an exact sequence can address this issue.

Modern decoders may allow decoding of multiple instructions at the same time. The above-described implementation may be expanded in several ways to cover this. First, decoding of instructions being 'searched for' can be limited to be one at a time. In the REP MOVSB example, the REP MOVSD and REP STOSD instructions will be decoded by themselves. Second, multiple compare operations can be placed on the output of each decoder and serialized (flush later operations) or multiple comparators used for all expected codes to allow the state machine to follow the code sequence from any operation. If non-serializing decode is used, the state machine may be extended to support multiple step branches simultaneously (decode of second match in parallel to the first, etc).

Embodiments thus allow optimization of a REP MOVSB instruction that provides significant gain on new code, without causing a performance loss on existing code that was optimized to use REP MOVSD+B sequences.

Figure 4:
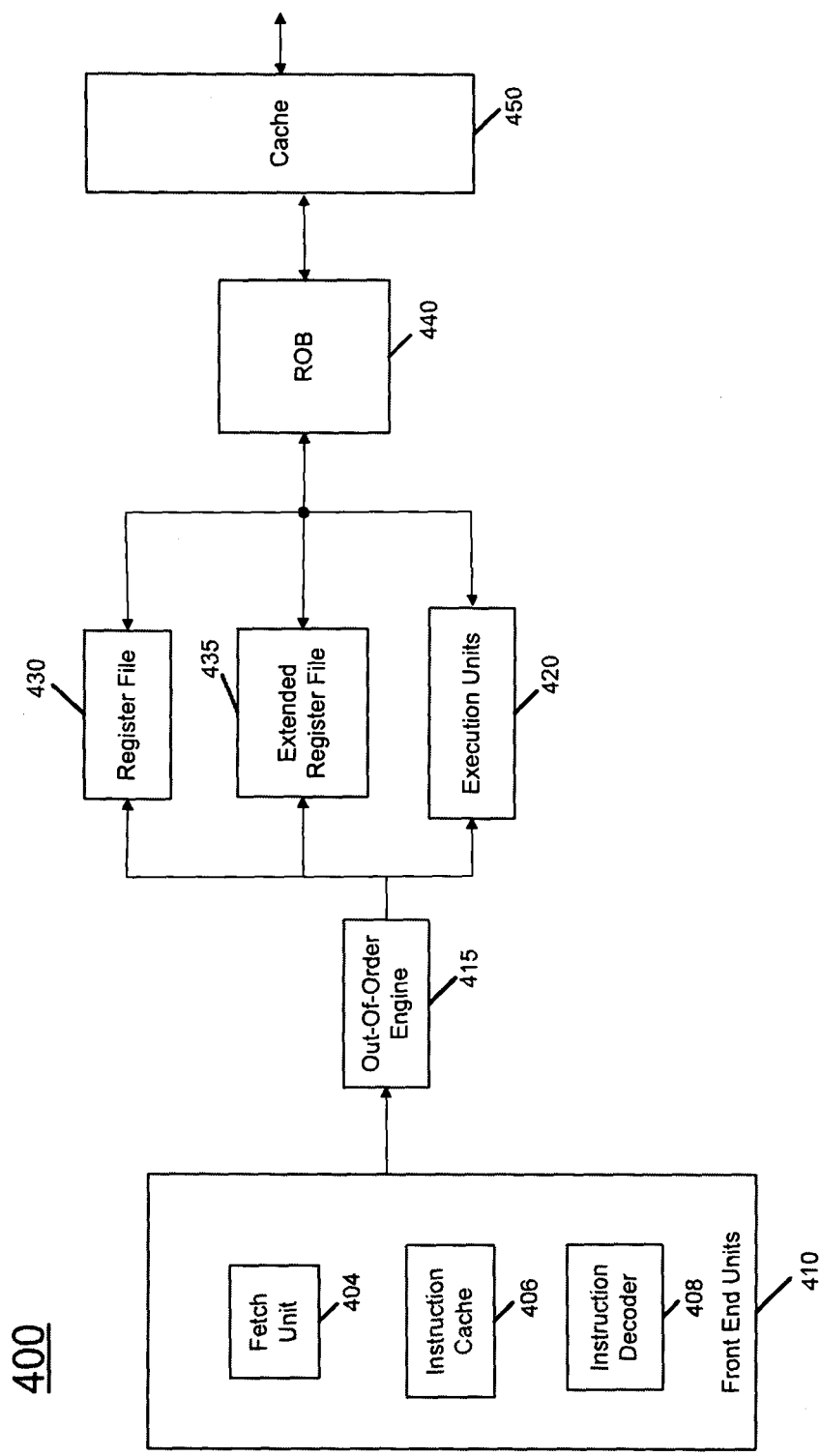
FIG. 4 is a block diagram of a processor in accordance with one embodiment of the present invention.

Referring now to FIG. 4, shown is a block diagram of a processor in accordance with one embodiment of the present invention. As shown in FIG. 4, processor 400 may be a multi-stage pipelined out-of-order processor. Processor 400 is shown with a relatively simplified view in FIG. 4 to illustrate various features used in connection with instruction tuning as described above.

As shown in FIG. 4, processor 400 includes front end units 410, which may be used to fetch macro-instructions to be executed and prepare them for use later in the processor. For example, front end units 410 may include a fetch unit 404, an instruction cache 406, and an instruction decoder 408. In some implementations, front end units 410 may further include a trace cache, along with micro-code storage as well as an pop storage. Fetch unit 404 may fetch macro-instructions, e.g., from memory or instruction cache 406, and feed them to instruction decoder 408 to decode them into primitives, i.e., µops for execution by the processor. Instruction decoder 408 may be configured in accordance with an embodiment of the present invention to include logic to perform sequence detection such that when an incoming group of instructions includes a predetermined sequence of two or more instructions (or a sequence of selected instructions within close proximity of each other, e.g., as discussed above) the logic may cause instruction decoder 408 to provide different decoded instructions, e.g., µops for execution later in the processor pipeline, to optimize performance. Still further, in some implementations, when a given macro-instruction is received, instruction decoder 408 may cause a given micro-code sequence to be sent for execution, where this sequence may handle fast mode copy operations in accordance with an embodiment of the present invention. In other implementations, an execution unit can be extended with certain hardware to perform such fast copy operations efficiently responsive to a decoded instruction.

Coupled between front end units 410 and execution units 420 is an out of order (OOO) engine 415 that may be used to receive the micro-instructions and prepare them for execution. More specifically OOO engine 415 may include various buffers to re-order micro-instruction flow and allocate various resources needed for execution, as well as to provide renaming of logical registers onto storage locations within various register files such as register file 430 and extended register file 435. Register file 430 may include separate register files for integer and floating point operations. Extended register file 435 may provide storage for vector-sized units, e.g., 256 or 512 bits per register.

Various resources may be present in execution units 420, including, for example, various integer, floating point, and single instruction multiple data (SIMD) logic units, among other specialized hardware. Results may be provided to retirement logic, namely a reorder buffer (ROB) 440. More specifically, ROB 440 may include various arrays and logic to receive information associated with instructions that are executed. This information is then examined by ROB 440 to determine whether the instructions can be validly retired and result data committed to the architectural state of the processor, or whether one or more exceptions occurred that prevent a proper retirement of the instructions. Of course, ROB 440 may handle other operations associated with retirement.

As shown in FIG. 4, ROB 440 is coupled to a cache 450 which, in one embodiment may be a low level cache (e.g., an L1 cache) although the scope of the present invention is not limited in this regard. Also, execution units 420 can be directly coupled to cache 450. From cache 450, data communication may occur with higher level caches, system memory and so forth. While shown with this high level in the embodiment of FIG. 4, understand the scope of the present invention is not limited in this regard.

Figure 5:
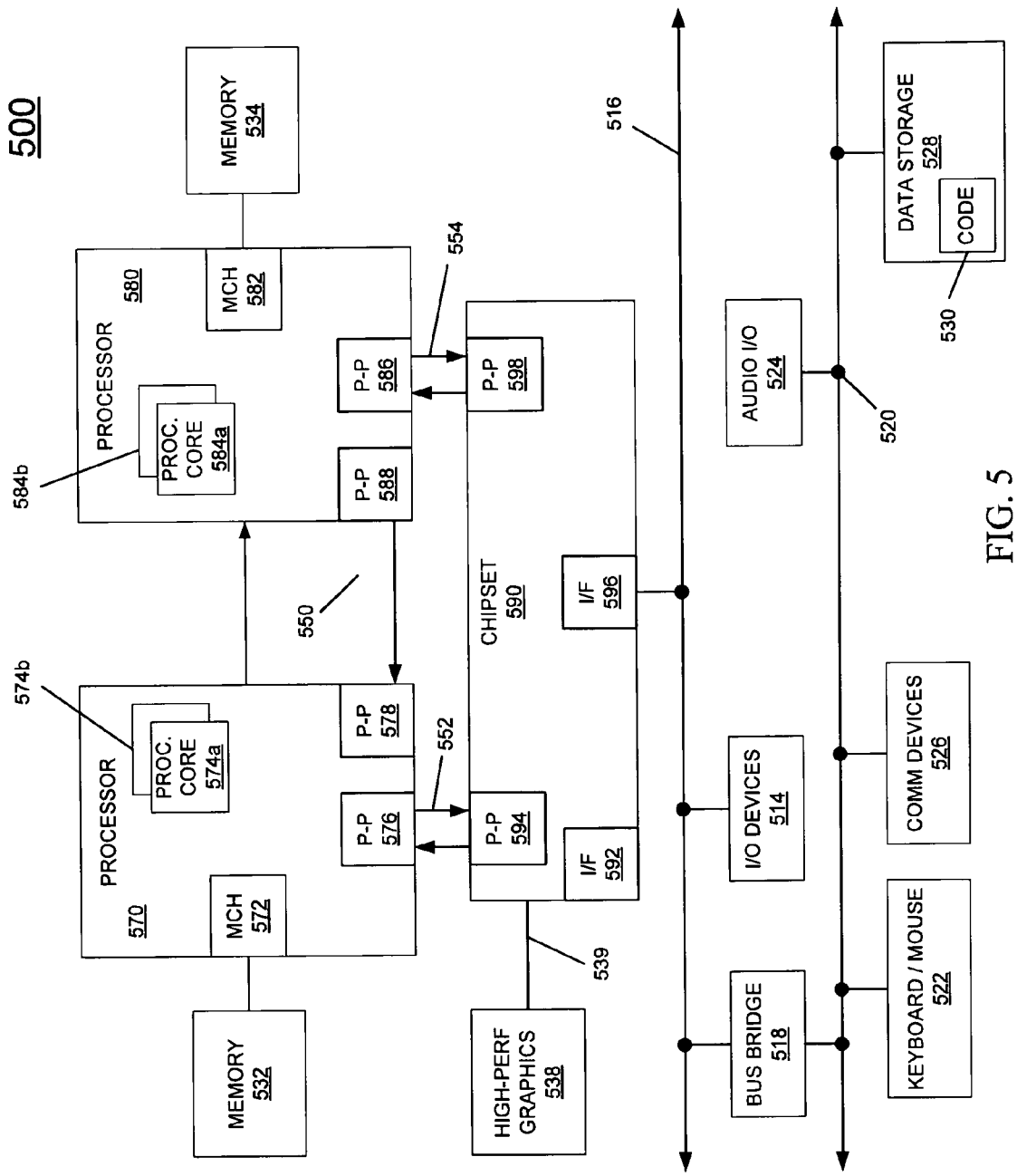
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574*a* and 574*b* and processor cores 584*a* and 584*b*). Each processor core may include hardware, software and firmware such as shown in FIGS. 1-4 to perform instruction tuning.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an execution unit to perform operations indicated by instruction codes; and
an instruction decoder to decode a first incoming instruction into a first instruction code or a second instruction code based on a path select signal indicative of detection of a sequence of instructions, wherein the instruction decoder is to receive the path select signal from a sequence detector coupled to the instruction decoder, the path select signal having a second state to correspond to detection of a second incoming instruction used in conjunction with the first incoming instruction and received in the instruction decoder within a threshold distance of the first incoming instruction, the instruction decoder to decode the first incoming instruction into the first instruction code to cause the execution unit to run a first optimized operation responsive to the path select signal having a first state and to otherwise decode the first incoming instruction into the second instruction code to cause the execution unit to run a second optimized operation responsive to the path select signal having the second state.

2. The apparatus of claim 1, further comprising a comparator to receive an instruction code from the instruction decoder and an expected code from the sequence detector and to generate a match signal if the instruction code and the expected code match.

3. The apparatus of claim 2, wherein the sequence detector is to generate the path select signal of the first state to cause the instruction decoder to decode the first incoming instruction into the first instruction code if the match signal is not generated, the first instruction code corresponding to a copy operation optimized for a first data length.

4. The apparatus of claim 3, wherein the sequence detector is to generate the path select signal of the second state to cause the instruction decoder to decode the first incoming instruction into the second instruction code responsive to the match signal, the second instruction code corresponding to the copy operation optimized for a second data length different than the first data length.

5. The apparatus of claim 4, wherein the second instruction code is to cause the execution unit to perform the copy operation of a limited length.

6. The apparatus of claim 4, wherein the sequence detector is to generate the path select signal of the second state if the second incoming instruction is received by the instruction decoder within a first number of instructions corresponding to the threshold distance from the first incoming instruction.

7. The apparatus of claim 6, wherein the threshold distance is approximated by a number of cycles and decode stall information.

8. The apparatus of claim 6, wherein the sequence detector includes a state machine, the state machine to reset if the different incoming instruction is not received within the first number of instructions.

9. A system comprising:
   a processor having a front end including a decoder to decode an incoming copy instruction into a first instruction code or a second instruction code based on a select signal generated by a sequence detector, the select signal having a second state indicative of a receipt of a sequence of instructions in the decoder including the incoming copy instruction and at least one other copy instruction, the decoder to decode the incoming copy instruction into the second instruction code responsive to the select signal having the second state and otherwise to decode the first incoming copy instruction into a first instruction code, the processor further having an execution unit to receive the first or second instruction code and to perform a first copy operation or a second copy operation respectively, responsive thereto; and
   a dynamic random access memory (DRAM) coupled to the processor.

10. The system of claim 9, the sequence detector to generate the select signal having the second state to cause the decoder to generate the second instruction code if the incoming copy instruction is received within a first number of instructions after a second incoming copy instruction corresponding to the at least one other copy instruction, and to otherwise cause the decoder to generate the first instruction code.

11. The system of claim 10, wherein the sequence detector is to reset to a first state to search for the second incoming copy instruction if the incoming copy instruction is not received within the first number of instructions.

12. The system of claim 11, wherein the sequence detector is to advance from the first state to the second state to search for the incoming copy instruction after the second incoming copy instruction is detected.

13. The system of claim 10, further comprising a comparator to receive an instruction code from the decoder and an expected code from the sequence detector and to generate a match signal if the instruction code and the expected code match.

14. The system of claim 9, wherein the first copy operation is optimized for a first data length, and the second copy operation is optimized for a second data length different from the first data length.

* * * * *